United States Patent [19]

Maekawa et al.

[11] 4,241,886
[45] Dec. 30, 1980

[54] RETRACTOR DEVICE FOR SEAT BELT MECHANISM

[75] Inventors: Naozane Maekawa, Toyokawa; Takeshi Awano, Okazaki, both of Japan

[73] Assignee: Mitsubishi Jidosha Kogyo Kabushiki Kaisha, Tokyo, Japan

[21] Appl. No.: 70,988

[22] Filed: Aug. 30, 1979

[30] Foreign Application Priority Data

Sep. 8, 1978 [JP] Japan ............................ 53/124248[U]

[51] Int. Cl.³ ...................... A62B 35/02; B65H 75/48
[52] U.S. Cl. .......................... 242/107.2; 242/107.4 A; 280/803
[58] Field of Search ...................... 242/107.2, 107.4 R, 242/107.4 E; 280/801–808; 297/476–480, 483

[56] References Cited

U.S. PATENT DOCUMENTS

| | | | |
|---|---|---|---|
| 3,911,535 | 10/1975 | Mauron | 242/107.2 X |
| 4,120,466 | 10/1978 | Adomeit | 242/107.2 |
| 4,163,530 | 8/1979 | Kondo et al. | 242/107.2 |

*Primary Examiner*—John M. Jillions
*Attorney, Agent, or Firm*—Oldham, Oldham, Hudak & Weber

[57] ABSTRACT

A retractor device for a seat belt mechanism, comprising a ratchet wheel mounted on a reel shaft for reeling a seat belt, a pawl engageable with the ratchet wheel, a belt stop member disposed opposite to an abutment surface on a casing, guide slots in the casing and emergency operating means sensible to an emergency condition of a vehicle. Said means is operable to engage the pawl with the ratchet wheel to prevent rotation of the shaft and to move the stop member along the slots in a direction of drawing of the belt to clamp the latter between the stop member and the abutment surface, thereby preventing the drawing of the belt due to tightening thereof.

6 Claims, 4 Drawing Figures

RETRACTOR DEVICE FOR SEAT BELT MECHANISM

BACKGROUND OF THE INVENTION

This invention relates to an improvement of a retractor device for reeling seat belts for protecting a passenger in a vehicle.

A conventional retractor for a seat belt mechanism mounted in a vehicle is designed to sense an acceleration of a vehicle body or an acceleration of the belt to be drawn by movement of the passenger upon emergency of the vehicle and to stop rotation of a reel shaft for reeling the seat belt. However, in such a retractor, even when the rotation of the reel shaft is prevented, the belt is additionally drawn out from the retractor due to tightening of the belt wound on the reel shaft by an inertia of the passenger moving forwardly. As a result, restraining of the passenger by the seat belt is insufficient so that the passenger may hit against a steering wheel or an instrument panel in front of the passenger and be injured.

Also, in a passive seat belt mechanism in which one end of the seat belt is supported by a door of the vehicle and the belt is automatically set into a restraining position and a releasing position with respect to the passenger depending on closing and opening of the door, the belt is reeled into the retractor by a substantial amount in said restraining position so as to permit the belt to be switched from the restraining position to the releasing position. This results in an increase of drawing of the seat belt due to said tightening of the belt wound on the reel shaft, so that restraining of the passenger by the seat belt becomes more insufficient.

SUMMARY OF THE INVENTION

An object of this invention is to provide a retractor device for a seat belt mechanism in which the drawing of the seat belt due to tightening of the belt in the retractor is effectively prevented upon emergency of the vehicle, and in which a locking mechanism for a seat belt reel shaft and a mechanism for preventing the drawing of the belt are effectively operated by a single sensor.

BRIEF DESCRIPTION OF THE DRAWINGS

This invention will be explained by way of example with reference to the accompanying drawings in which.

DESCRIPTION OF THE PREFERRED EMBODIMENTS

A preferred embodiment of a seat belt mechanism used with a retractor device according to the invention is now explained with reference to FIG. 1. This seat belt mechanism is a passive seat belt mechanism of a type disclosed in U.S. application Ser. No. 10,383, filed on Feb. 8, 1979 and owned by the same applicants.

Figure 1:
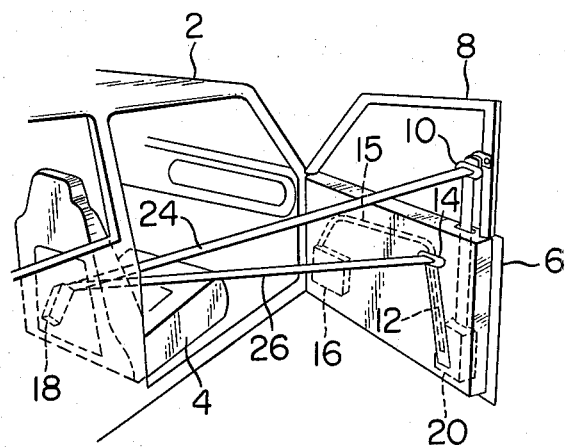
FIG. 1 is a schematic perspective view of a vehicle equipped with a passive seat belt mechanism associated with a retractor device according to the invention.

Referring to FIG. 1, a motor vehicle comprises a body 2, a seat 4 and a door 6 being pivotally supported by the body 2 to be opened and closed and having a sash 8 defining a window. The passive seat belt mechanism comprises a fixed through ring 10 attached to the rearward and upper portion of the sash 8, a guide rail 12 provided on an inside surface of the door 6 and extending upwardly and slightly forwardly from the rearward and lower portion of the door, a movable through ring 14 slidably supported in the guide rail 12, an actuator device 16 operable in response to opening and closing of the door 6 and adapted to move the movable through ring 14 along the guide rail 12 through a cable 15 such that the ring 14 is moved toward the lower portion of the guide rail 12 when the door 6 is closed and toward the upper portion of the guide rail 12 when the door 6 is opened, a belt hold member 18 fixed to the seat 4 at the side thereof nearer to the center of the body 2, the retractor device 20 provided in an interior space of the door 6 at the rearward and lower portion thereof, a shoulder belt 24 having one end held by the belt hold member 18 and the other end inserted through the fixed through ring 10 and reeled into the retractor device 20, and a waist belt 26 having one end held by the belt hold member 18 and the other end extending through the movable through ring 14 and reeled into the retractor device 20.

According to the passive seat belt mechanism as constructed above, when the door 6 is opened as shown in FIG. 1, the shoulder belt 24 is drawn out from the retractor device 20 to be stretched between the belt hold member 18 and the fixed through ring 10, while the waist belt 26 is drawn out from the retractor device 20 to be stretched between the belt hold member 18 and the movable through ring 14 which is moved to the upper portion of the guide rail 12 by the actuator device 16. As both belts 24 and 26 are moved forwardly away from the seat 4, the passenger can easily get into and out of the vehicle. When the passenger sits on the seat 4 and closes the door 6, the movable through ring 14 is moved to the lower portion of the guide rail 12 by the actuator device 16, and at the same time the shoulder belt 24 and the waist belt 26 are reeled back into the retractor device 20 to be stretched. Consequently, the shoulder belt 24 restrains the upper body of the passenger, whereas the waist belt 26 restrains the waist of the passenger.

A preferred embodiment of the retractor device 20 according to the invention is now explained with reference to FIGS. 2 to 4.

Figure 3:
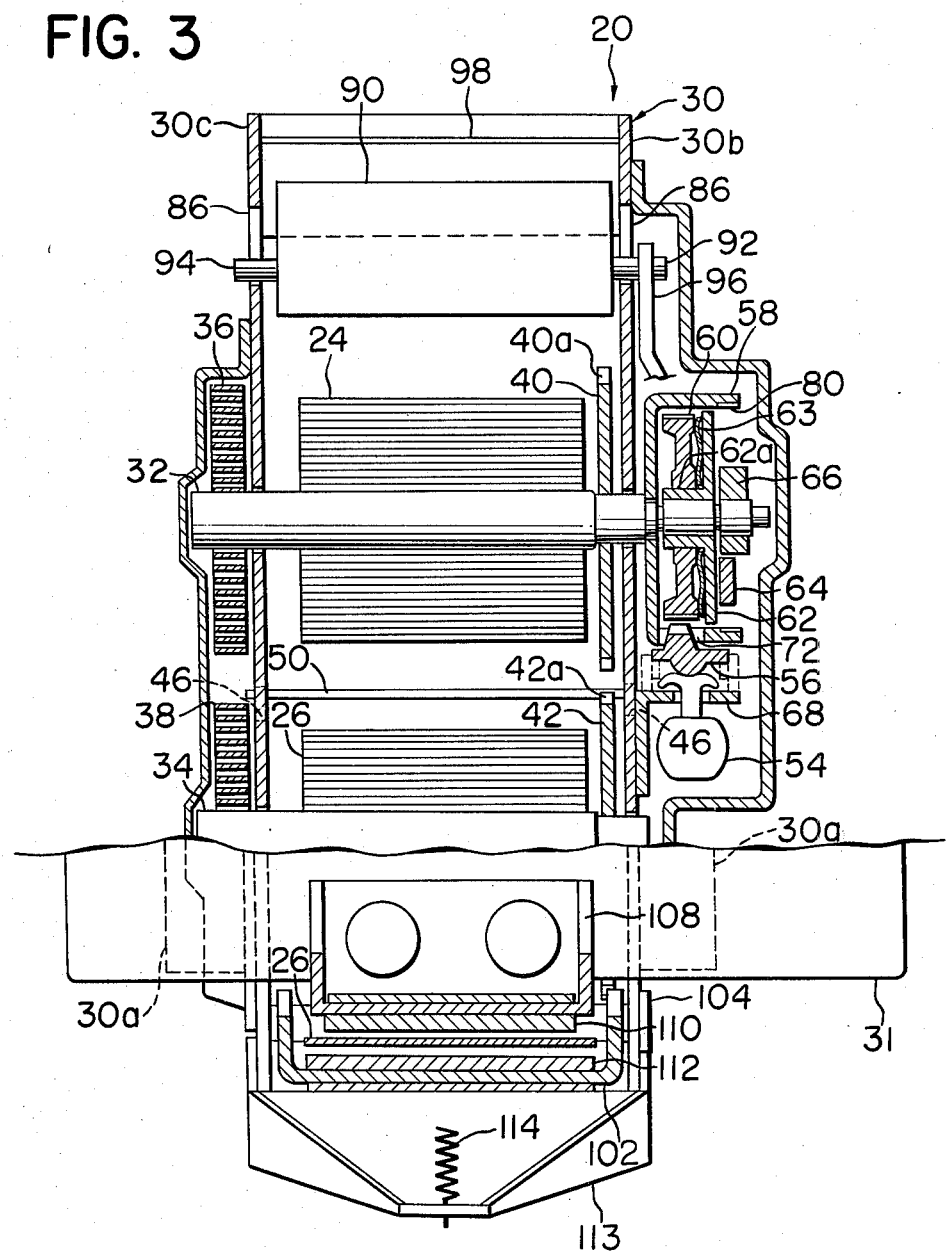
FIG. 3 is a cross-sectional view taken along the line III—III in FIG. 2.
Figure 2:
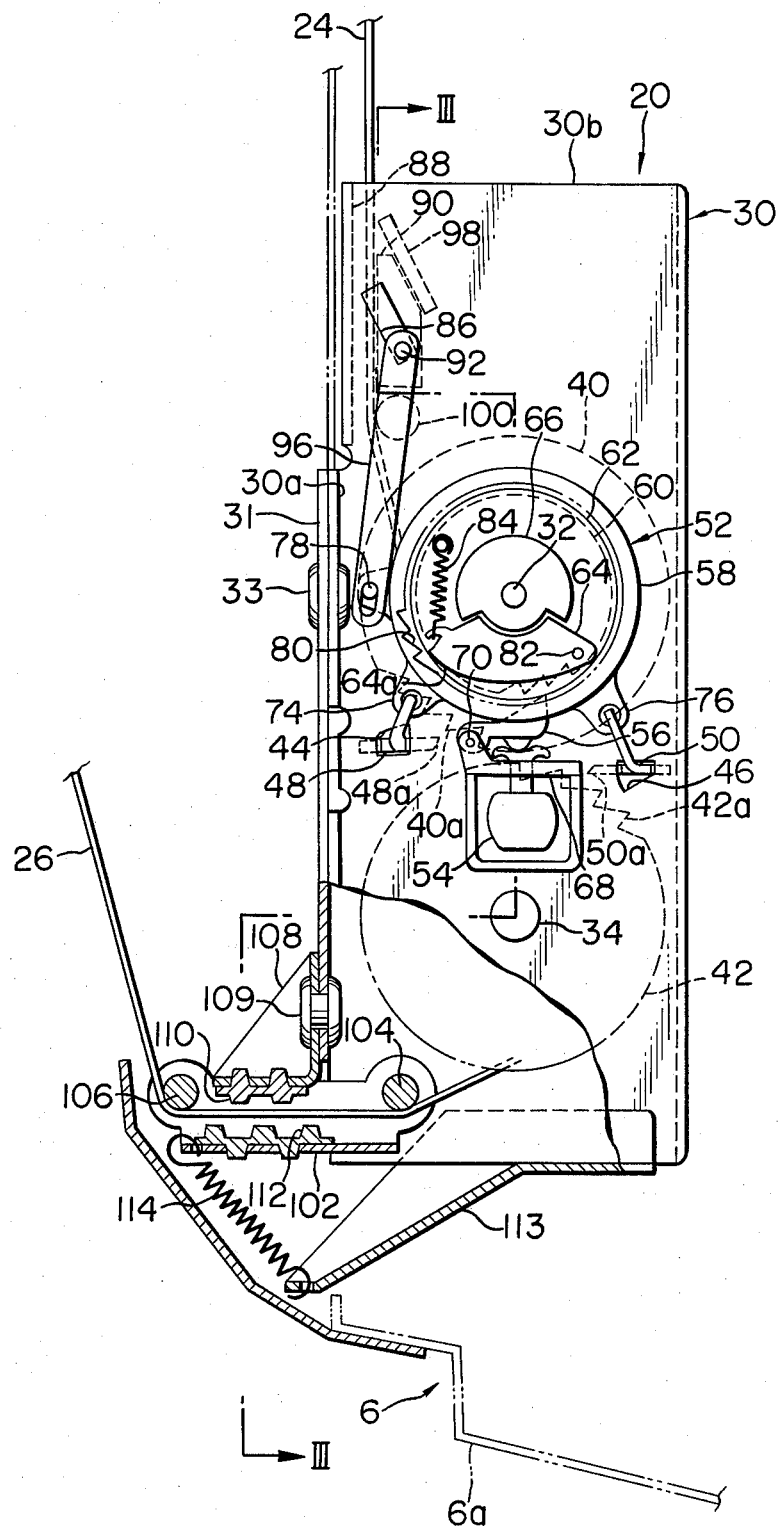
FIG. 2 is a longitudinal cross-sectional view of the retractor device.
Figure 4:
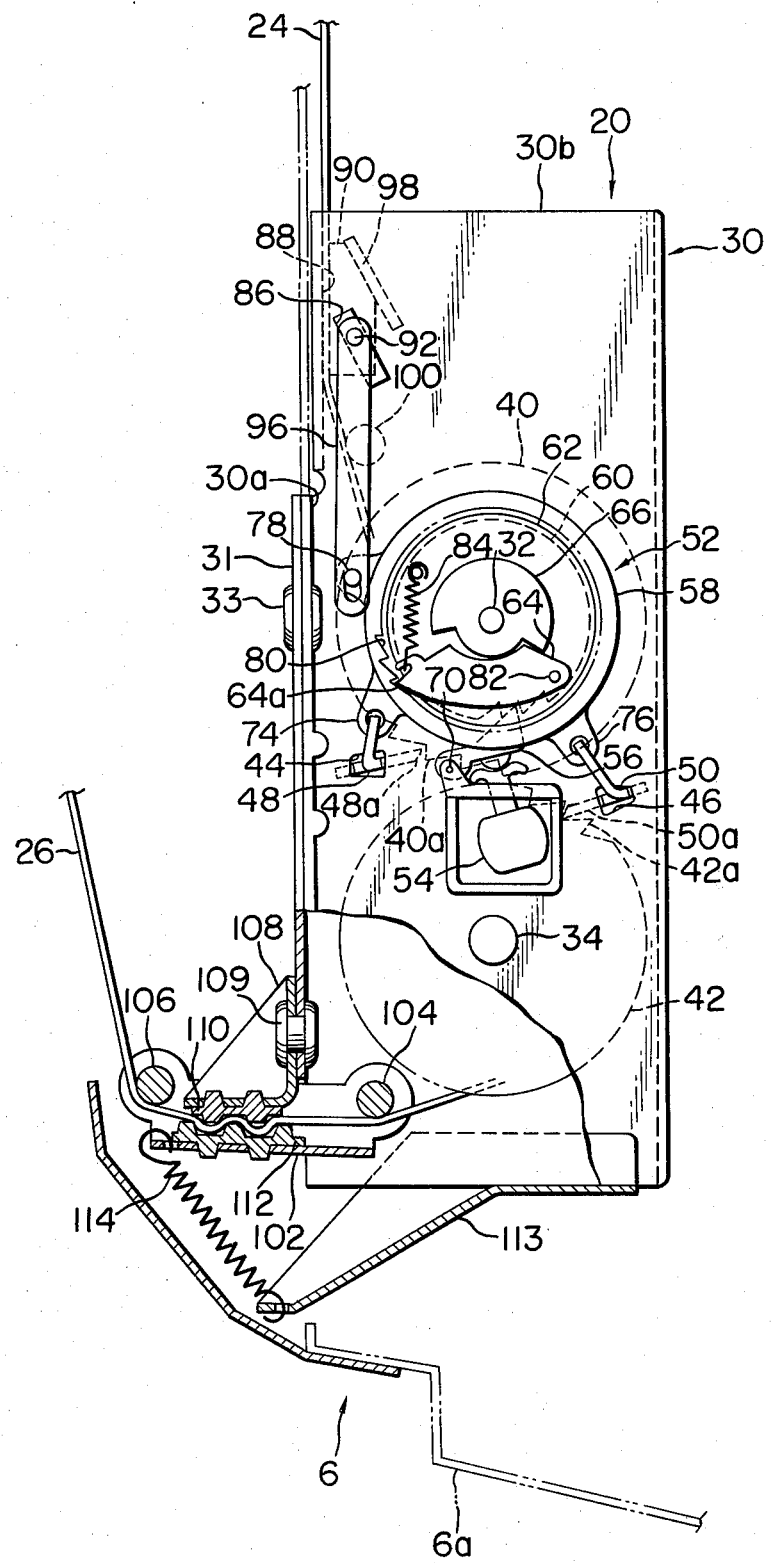
FIG. 4 is a cross-sectional view similar to FIG. 2 with the retractor device being in operation.

Referring to FIGS. 2 to 4, the retractor device 20 comprises a casing 30 having a substantially U-shaped cross section and formed at its longitudinal edges with integral flanges 30a extending outwardly. The flanges 30a are fixed by rivets 33 (only one is shown in FIG. 2) on a base plate 31 which is attached to an inner panel of the door 6. A first reel shaft 32 for reeling the shoulder belt 24 and a second reel shaft 34 for reeling the waist belt 26 are rotatably supported between opposite side walls 30b and 30c of the casing 30. Spiral springs 36 and 38, respective one ends of which are attached to the reel shafts 32 and 34, are held at the other ends on the side wall 30c of the casing 30 so as to bias the reel shaft 32 and 34 in the directions that the belts 24 and 26 are wound. Ratchet wheels 40 and 42 having teeth 40a and 42a are fixedly mounted on the reel shaft 32 and 34 respectively. The side walls 30b and 30c of the casing are formed with scalloped slots 44 and 46 into which respective opposite ends of pawls 48 and 50 made of a thick plate are rotatably inserted. The pawls 48 and 50 are formed with engageable portions 48a and 50a respectively. When the pawls 48 and 50 are rotated by emergency operating means 52 as described hereinafter, the engageable portions 48a and 50a engage with the teeth 40a and 42a of the ratchet wheels 40 and 42, respectively, to prevent the rotation of the reel shafts 32 and 34 in the direction corresponding to drawing out of the belts. The emergency operating means 52 comprises a pendulum 54, a stopper 56, a clutch wheel 58, a gear wheel 60, flywheel 62, a hook member 64 and a cam 66. The pendulum 54 is tiltably supported by a bracket 68 fixed to the side wall 30b of the casing 30. The stopper 56 is pivotally supported on the bracket 68 by a pin 70 and abuts against the upper end of the pendulum 54. The stopper 56 is rotated upwardly (in a counterclockwise direction in FIG. 2) when the pendulum 54 is tilted. The clutch wheel 58 of a cylindrical shape with a bottom is loosely fitted on the first reel shaft 32 and formed with an aperture 72 which permits the stopper 56 to enter into the interior of the clutch wheel. The clutch wheel 58 is also provided at its outer periphery with engageable portions 74 and 76 which project therefrom and engage with the pawls 48 and 50 to interlock the clutch wheel 58 with the pawls. The clutch wheel 58 is formed at its inner periphery with inner teeth 80. The gear wheel 60 having an outer diameter slightly smaller than an inner diameter of the clutch wheel 58 is rotatably mounted on a boss portion 62a of the flywheel 62. The flywheel 62 has an outer diameter substantially the same as that of the gear wheel 60 and is rotatably mounted on the first reel shaft 32 at an end portion thereof axially outwardly away from the location of the bottom of the clutch wheel 58 on the reel shaft. A belleville spring 63 is interposed between the gear wheel 60 and the flywheel 62 so that a frictional resistance is created therebetween when the gear wheel 60 rotates relative to the flywheel 62. The hook member 64 is pivoted on the flywheel 62 to rotate about a pin 82. An engageable portion 64a on a tip of the hook member 64 engages with the inner teeth 80 of the clutch wheel 58 when the hook member is rotated outwardly relative to the first reel shaft 32 (in a counterclockwise direction about the pin 82). The hook member 64 is biased toward the first reel shaft 32 or in a radially inward direction by a spring 84 tensioned between the flywheel 62 and the hook member. The cam 66 is fitted on the first reel shaft 32 with a sufficient frictional force. As the cam 66 is rotated with the first reel shaft 32 relatively to the flywheel 62 in a direction corresponding to drawing of the shoulder belt 24 upon an emergency such as a collision of the vehicle, the cam urges the hook member 64 outwardly against a force of the spring 84 to engage the engageable portion 64a of the hook member 64 with the inner teeth 80 of the clutch wheel 58, thereby rotating the latter with the cam 66. Since the hook member 64 is normally urged into abutment with the cam 66 to prevent engagement between the hook member and the inner teeth 80 of the clutch wheel 58, the cam 66 and the flywheel 62 can rotate as a unit when the first reel shaft 32 is rotated by normal drawing of the shoulder belt 24. Therefore, the hook member 64 is rotated with the cam 66 under the condition of engagement between the hook member and the inner teeth 80 of the clutch wheel 58 in the following two cases; the first is a case that, upon an emergency of the vehicle, the shoulder belt 24 is drawn under the condition that the pendulum 54 is tilted by an abnormal acceleration of the vehicle body to cause the stopper 56 to engage with the gear wheel 60. At this time, since the flywheel 62 is frictionally connected to the gear wheel 60 through the belleville spring 63, the flywheel is restrained or limited its rotation by the friction force so that the cam 66 is rotated relatively to the flywheel 62 in the direction corresponding to drawing of the shoulder belt 24. Consequently, the hook member 64 is rotated with the cam 66 under the condition that it is engaged with the inner teeth 80 of the clutch wheel 58 by the cam 66. The second is a case that the shoulder belt 24 is drawn out at an abnormal acceleration. When this happens, rotation of the flywheel 62 is delayed relatively to the cam 66 by an inertial mass of the flywheel. Consequently, as in said first case, the hook member 64 is rotated with the cam 66 under the condition that it is engaged with the inner teeth 80 of the clutch wheel 58 by the cam 66. It is therefore apparent from the above that the emergency operating means 52 is operated either when the abnormal acceleration acts on the vehicle body or when the shoulder belt 24 is drawn out at the abnormal acceleration.

The casing 30 is formed with guide slots 86 at portions of the side walls 30b and 30c of the casing adjacent to passage of the shoulder belt 24. The guide slots 86 are disposed with respect to the shoulder belt 24 oppositely to an abutment surface 88 formed on the casing 30 along the passage of the shoulder belt 24. The guide slots 86 are arranged to gradually approach to the abutment surface 88 toward the direction of drawing of the shoulder belt 24. Belt stop member 90 is provided at its opposite ends with pins 92 and 94 which are slidably inserted into the guide slots 86. A link 96, one end of which is connected to the pin 92, is connected at the other end to a pin 78 provided on the clutch wheel 58. The link 96 lifts up the belt stop member 90 to clamp the shoulder belt 24 between the belt stop member and the abutment surface 88 when the clutch wheel 58 is rotated in the direction corresponding to drawing out of the shoulder belt 24. An auxiliary plate 98 is secured to the side walls 30b and 30c of the casing and bears against the belt stop member 90 when the latter clamps the shoulder belt 24. A shaft member 100 guides the shoulder belt 24 to normally prevent the latter from contacting with the belt stop member 90. The abutment surface 88 may be provided with friction intensifying means such as knurling to assure the stopping effect of the shoulder belt 24.

An arm 102 is pivotally supported by a portion of the casing 30 adjacent to passage of the waist belt 26 through a pin 104 which also functions to guide the waist belt. A shaft member 106 for guiding the waist belt 26 is pivotally supported at a free end of the arm 102. A bracket 108 having a wall surface opposite to the arm 102 is secured to the base plate 31 by a rivet 109. When the arm 102 is rotated upwardly (in a clockwise direction in FIG. 2), the waist belt 26 is clamped between a clamp member 110 mounted on the wall surface of the bracket 108 and a clamp member 112 mounted on the upper surface of the arm 102. A spring 114 is tensioned between the arm 102 and a bracket 113 fixed to the housing 30 and has a biasing force greater than a rotational force acting onto the arm 102 through the shaft member 106 by normal drawing of the waist belt 26.

In normal operation of the retractor device, in which neither the abnormal acceleration acts on the vehicle body nor the shoulder belt 24 is drawn out at the abnormal acceleration, the emergency operating means 52 is not operated, so that the belt reel shafts 32 and 34 are not prevented from rotating. Also, the belt stop member 90 is in non-contacting position with respect to the shoulder belt 24. Therefore, the belts 24 and 26 can be freely drawn out and reeled into the retractor device.

Upon an emergency such as a collision of the vehicle, in which the abnormal acceleration acts on the vehicle body or the shoulder belt 24 is drawn out at the abnormal acceleration, the emergency operating means 52 is operated to rotate the clutch wheel 58 in the direction corresponding to drawing of the shoulder belt 24 as hereinbefore described, so that the pawls 48 and 50 are rotated to engage the respective engageable portions 48a and 50a thereof with the teeth 40a and 42a of the ratchet wheels 40 and 42, thereby preventing rotation of the reel shafts 32 and 34. Simultaneously, by rotation of the clutch wheel 58, the belt stop member 90 is lifted upwardly and presses the shoulder belt 24 against the abutment surface 88 on the casing 30 by the effect of the guide slots 86 to clamp the shoulder belt 24 with cooperation with the abutment surface 88. If the shoulder belt 24 is intended to be drawn further by movement of the passenger, the belt stop member 90 is moved further upwardly by a friction created by press-contact with the shoulder belt and clamps the shoulder belt more tightly between the stop member and the abutment surface 88 to prevent the drawing of the shoulder belt 24 by the effects of the guide slots 86 and the auxiliary plate 98. Thus, the further drawing of the shoulder belt 24 due to tightening of the shoulder belt wound on the first reel shaft 32 can be prevented. Also, if the waist belt 26 is intended to be drawn further by the movement of the passenger, the arm 102 is rotated upwardly against the biasing force of the spring 114 by drawing of the waist belt 26 since the rotation of the second reel shaft 34 is prevented. Consequently, the waist belt 26 is clamped between the clamp members 110 and 112, thereby preventing the further drawing of the waist belt 26 due to tightening of the belt wound on the second reel shaft 34.

According to the retractor device constructed as described above, two reel shafts for reeling two belts are prevented from rotating by a single locking mechanism, thereby making the retractor device simple and compact and also reducing the cost thereof. Also, as the both belts are prevented from being drawn out due to tightening of the belts caused by the inertia of movement of the passenger after stoppage of rotation of the both reel shafts, it is assured that the passenger is restrained by the belts and prevented from hitting against components of the vehicle such as an instrument panel and a steering wheel. Furthermore, the emergency operating means 52 is adapted to be operable in response to the abnormal acceleration of the vehicle body and the abnormal acceleration of drawing of the belt, so that even if either one of mechanisms for sensing the abnormal accelerations becomes inoperative for some reasons, the emergency operating means can be operated through the other mechanism, thereby providing an extremely reliable and safe retractor device.

What is claimed is:

1. A retractor device for a seat belt mechanism, comprising a casing, a reel shaft for reeling a seat belt being rotatably supported by said casing, a ratchet wheel fixedly mounted on said reel shaft, a pawl supported by said casing and adapted to engage with said ratchet wheel, an abutment surface provided on said casing along a passage provided for said belt, a belt stop member disposed opposite to said abutment surface with respect to said belt, guide slots formed in said casing for guiding said belt stop member toward said abutment surface to clamp said belt between them when the belt stop member is moved in a direction corresponding to drawing out of the belt, and emergency operating means sensible to an emergency condition of a vehicle to engage said pawl with said ratchet wheel and to move said belt stop member in said direction.

2. A retractor device according to claim 1, wherein said emergency operating means comprises a cylindrical clutch wheel operatively connected to said pawl and said belt stop member and rotatably supported on said reel shaft, and an emergency interlocking mechanism sensible to an emergency condition of the vehicle to interlock said clutch wheel with said reel shaft, said pawl being engaged with said ratchet wheel and said belt stop member being moved in said direction of drawing of the belt when said clutch wheel is rotated with said reel shaft in a direction corresponding to drawing of the belt.

3. A retractor device according to claim 2, wherein said emergency interlocking mechanism comprises a flywheel rotatably supported on said reel shaft, inner teeth formed on an inner periphery of said clutch wheel, a hook member located inside of said clutch wheel and pivotally supported on said flywheel, said hook member being engageable with said inner teeth of the clutch wheel when the hook member is moved outwardly with respect to said reel shaft, a cam fixed on said reel shaft and adapted to move said hook member outwardly when the cam rotates relatively to said flywheel in said direction of drawing of the belt, and a spring disposed between said hook member and said flywheel to bias the hook member into abutment with said cam so as to prevent engagement between said hook member and said inner teeth of the clutch wheel and to rotate said flywheel with said cam, rotation of said flywheel being delayed relatively to said cam by an inertial mass of the flywheel when said belt is drawn at an abnormal acceleration upon an emergency of the vehicle, whereby said hook member is urged outwardly against a biasing force of said spring by said cam and rotated with said cam under the condition that the hook member is engaged with said inner teeth of the clutch wheel.

4. A retractor device according to claim 3, wherein said emergency interlocking mechanism further comprises a gear wheel rotatably supported on said reel shaft adjacent to said flywheel and interlocked therewith through friction means, a stopper engageable with said gear wheel and mounted on said casing, and a pendulum tiltably supported by said casing and adapted to engage said stopper with said gear wheel when the pendulum is tilted, said flywheel to be rotated with said reel shaft and cam by drawing of said belt being restrained its rotation by said gear wheel through said friction means when said pendulum is tilted to engage said stopper with said gear wheel by an abnormal acceleration acting on said casing upon an emergency of the vehicle, whereby said hook member is rotated with said cam under the condition that the hook member is moved outwardly by the cam.

5. A retractor device according to claim 4, wherein said friction means consists of a belleville spring interposed between said flywheel and said gear wheel.

6. A retractor device for a seat belt mechanism, comprising a casing, first and second reel shafts for reeling first and second seat belts being rotatably supported by said casing, first and second ratchet wheels fixedly mounted on said first and second reel shafts respectively, first and second pawls supported by said casing and adapted to engage with said first and second ratchet wheels respectively, a belt stop member disposed with respect to said first belt oppositely to an abutment surface provided on said casing along a passage provided for the first belt, said belt stop member being guided along guide slots formed in said casing so as to press the first belt against said abutment surface to prevent drawing of said belt when the belt stop member is moved in a direction corresponding to the drawing of the belt, and emergency operating means sensible to an emergency condition of a vehicle to engage said first and second pawls with said first and second ratchet wheels and to move said belt stop member into a position for preventing the drawing of said first belt.

* * * * *